US012582937B2

(12) United States Patent
Mi et al.

(10) Patent No.: US 12,582,937 B2
(45) Date of Patent: Mar. 24, 2026

(54) CARBON DIOXIDE PURIFICATION SYSTEM

(71) Applicant: M iCell Technology Co., Ltd., Taipei City (TW)

(72) Inventors: Hsin-Wu Mi, Taipei City (TW); Chao-Kang Chang, Taipei City (TW); Hsin-Tsai Wang, Taipei City (TW); Chang-Hung Tu, Taipei City (TW); Zih-Cian Kuo, Taipei City (TW)

(73) Assignee: M ICELL TECHNOLOGY CO., LTD., Taipei City (TW)

( * ) Notice: Subject to any disclaimer, the term of this patent is extended or adjusted under 35 U.S.C. 154(b) by 333 days.

(21) Appl. No.: 18/351,435

(22) Filed: Jul. 12, 2023

(65) Prior Publication Data

US 2024/0050888 A1 Feb. 15, 2024

(30) Foreign Application Priority Data

Aug. 12, 2022 (TW) .................................. 111130434

(51) Int. Cl.
| | |
|---|---|
| *B01D 53/047* | (2006.01) |
| *B01D 53/26* | (2006.01) |
| *B01D 53/00* | (2006.01) |

(52) U.S. Cl.
CPC ......... *B01D 53/047* (2013.01); *B01D 53/265* (2013.01); *B01D 53/002* (2013.01); *B01D 2253/116* (2013.01); *B01D 2257/504* (2013.01); *B01D 2259/4141* (2013.01)

(58) Field of Classification Search
CPC .. B01D 53/047; B01D 29/56; B01D 2259/41; B01D 2259/4145

USPC ......... 427/453, 455, 250, 304; 502/414, 416
See application file for complete search history.

(56) References Cited

U.S. PATENT DOCUMENTS

| | | | | |
|---|---|---|---|---|
| 2010/0212495 | A1* | 8/2010 | Gadkaree | B01J 20/3441 |
| | | | | 502/437 |
| 2014/0053761 | A1* | 2/2014 | Galasso | B01D 53/62 |
| | | | | 110/345 |

FOREIGN PATENT DOCUMENTS

| | | | | |
|---|---|---|---|---|
| CN | 108569698 | A | * 9/2018 | |
| GB | 2337212 | A | * 11/1999 | C10K 1/32 |

OTHER PUBLICATIONS

Kyung-Mi Lee, Yun-Hui Lim, Chan-Jung Park, and Young-Min Jo, "Adsorption of Low-Level CO2 Using Modified Zeolites and Activated Carbon" Industrial & Engineering Chemistry Research, 51, 2012, pp. 1355-1363.

(Continued)

*Primary Examiner* — Jennifer Dieterle
*Assistant Examiner* — Rachel Marie Slaugovsky
(74) *Attorney, Agent, or Firm* — HSML P.C.

(57) ABSTRACT

A carbon dioxide purification system for the treatment of a waste gas produced by a generator includes a water removal unit having at least one drying device, and a purification unit having a plurality of pressure swing adsorption devices disposed and connected in series with each other. The at least one drying device is used to reduce water vapor in the waste gas and to form a dry gas mixture having carbon dioxide gas. The pressure swing adsorption devices are used to purify carbon dioxide gas from the dry gas mixture, so as to obtain a gas product containing carbon dioxide gas with a purity of more than 99.5%.

8 Claims, 6 Drawing Sheets

(56) References Cited

OTHER PUBLICATIONS

Luca Riboldi, Olav Bolland, Jacob M. Ngoy, Nicola Wagner, "Full-plant analysis of a PSA $CO_2$ capture unit integrated in coalfired power plants: post- and pre-combustion scenarios" Energy Procedia, 63, 2014, pp. 2289-2304.
Search Report appended to an Office Action, which was issued to Taiwanese counterpart application No. 111130434 by the TIPO on Sep. 4, 2023, with an English translation thereof.

* cited by examiner

CARBON DIOXIDE PURIFICATION SYSTEM

CROSS-REFERENCE TO RELATED APPLICATION

This application claims priority of Taiwanese Invention Patent Application No. 111130434, filed on Aug. 12, 2022.

FIELD

The present disclosure relates to a carbon dioxide purification system for the treatment of a waste gas produced by a generator.

BACKGROUND

A waste gas containing carbon dioxide gas is often produced in the process of generating electricity from a fuel by a generator. If the waste gas is discharged without any treatment, the greenhouse gas content in the atmosphere will continue to increase, which will adversely affect the global climate. Recently, the problem of environmental pollution has received attention. How to purify carbon dioxide gas from the waste gas containing carbon dioxide gas produced by a generator to reduce carbon emissions is an important issue to be solved.

TW 1202397 B discloses a method for producing carbon dioxide from a combustion exhaust gas, which includes: introducing the combustion exhaust gas into a pre-purification unit through a gas feed conduit, so as to remove particles from the combustion exhaust gas; introducing the pre-purified combustion exhaust gas into a compressor through a gas feed conduit, so as to obtain a compressed combustion exhaust gas; introducing the compressed combustion exhaust gas into a purification unit through a feed conduit, such that nitrogen oxides, sulfur oxides, and water in the compressed combustion exhaust gas are removed, so as to obtain a purified combustion exhaust gas; introducing the purified combustion exhaust gas into a pressure swing device through a gas feed conduit, so as to obtain a carbon dioxide-enriched gas; and introducing the carbon dioxide-enriched gas into a liquefaction unit through a gas feed conduit, such that the carbon dioxide-enriched gas is liquefied and volatile contaminants are removed by distillation, so as to obtain liquid carbon dioxide having a purity of 64.41% to 99.16%.

In spite of the aforesaid, there is still a need to develop a carbon dioxide purification system for the treatment of a waste gas produced by a generator, which can effectively obtain high-purity carbon dioxide gas from the waste gas containing carbon dioxide gas for subsequent applications, and which can reduce carbon dioxide gas emissions.

SUMMARY

Accordingly, the present disclosure provides a carbon dioxide purification system for the treatment of a waste gas produced by a generator, which can alleviate at least one of the drawbacks of the prior art, and which includes:

a water removal unit which includes at least one drying device for reducing water vapor in the waste gas from the generator, the waste gas passing through the at least one drying device, so as to form a dry gas mixture having carbon dioxide gas, water vapor with a volume concentration of less than 1 ppm, carbon monoxide gas, and organic pollutants potentially harmful to a subject; and a purification unit which is disposed downstream of the water removal unit and communicates with the water removal unit, and includes a plurality of pressure swing adsorption devices disposed and connected in series with each other, the pressure swing adsorption devices being used to purify carbon dioxide gas from the dry gas mixture, so as to obtain a gas product containing carbon dioxide gas with a purity of more than 99.5%. Each pressure swing adsorption device is filled with a first adsorbent and a second adsorbent. The first adsorbent has an activated carbon molecular sieve and a first metal plating layer plated on the surface of the activated carbon molecular sieve, and the second adsorbent has an aluminosilicate molecular sieve and a second metal plating layer plated on the surface of the aluminosilicate molecular sieve. A volume ratio of the first adsorbent to the second adsorbent in decimal form is 1.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

For the purpose of this specification, it will be clearly understood that the word "comprising" means "including but not limited to", and that the word "comprises" has a corresponding meaning.

It is to be understood that, if any prior art publication is referred to herein, such reference does not constitute an admission that the publication forms a part of the common general knowledge in the art, in Taiwan or any other country.

Unless defined otherwise, all technical and scientific terms used herein have the meaning commonly understood by a person skilled in the art to which the present disclosure belongs. One skilled in the art will recognize many methods and materials similar or equivalent to those described herein, which could be used in the practice of the present disclosure. Indeed, the present disclosure is in no way limited to the methods and materials described.

Figure 1:
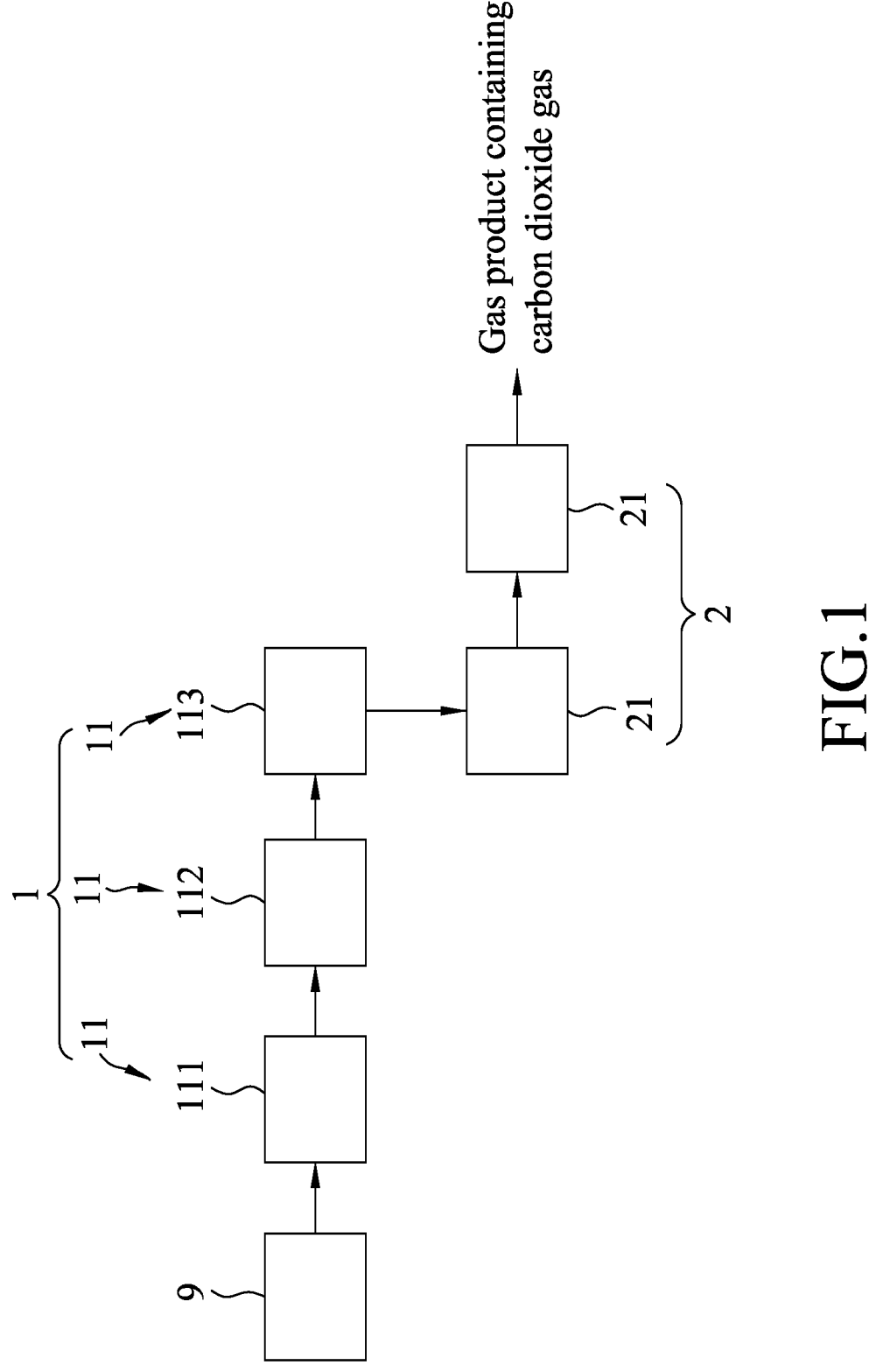
FIG. 1 is a schematic view illustrating a first embodiment of a carbon dioxide purification system for the treatment of exhaust gas produced by a generator according to the present disclosure.

Referring to FIG. 1, a first embodiment of a carbon dioxide purification system according to the present disclosure is suitable for processing a waste gas which is produced by the combustion of a fuel by a generator 9, and which contains carbon dioxide gas, water vapor, and substances other than carbon dioxide gas. The substances other than carbon dioxide gas include carbon monoxide gas and organic pollutants potentially harmful to a subject. Examples of the organic pollutant may include, but are not limited to, dioxins and dioxin-like compounds. In addition, the substances other than carbon dioxide gas may further include nitrogen oxide gas ($N_xO_y$), sulfur or halogen compounds.

According to the present disclosure, the carbon dioxide purification system includes a water removal unit 1 and a purification unit 2.

The water removal unit 1 includes three drying devices 11 which are connected to each other and are used to reduce water vapor in the waste gas from the generator 9. After the waste gas is discharged to the water removal unit 1, the waste gas passes through the three drying devices 11 in sequence, so as to form a dry gas mixture having carbon dioxide gas, water vapor with a volume concentration of less than 1 ppm, carbon monoxide gas, and organic pollutants potentially harmful to a subject. It should be noted that, the number of the drying device 11 is not limited to three, and can be adjusted arbitrarily (for example, one, two, or more than three), as long as the volume concentration of water vapor in the waste gas can be reduced to less than 1 ppm.

In certain embodiments, the three drying devices 11 are independently selected from the group consisting of a heat exchanger, a gas compressor, and a condensation dryer. It should be noted that, when the three drying devices 11 are composed of a heat exchanger, a gas compressor, and a condensation dryer, the three drying devices 11 are a heat exchanger 111, a gas compressor 112, and a condensation dryer 113 in sequence from upstream to downstream.

According to the present disclosure, the heat exchanger 111 is used to receive the waste gas from the generator 9, and part of the water vapor in the waste gas is condensed into liquid water by reducing the temperature of the waste gas, and then discharged, so as to obtain a first gas mixture containing carbon dioxide gas, water vapor, carbon monoxide gas, and organic pollutants potentially harmful to a subject.

According to the present disclosure, the gas compressor 112 is used to receive the first gas mixture from the heat exchanger 111, and part of the water vapor in the first gas mixture is converted into liquid water, and then discharged, so as to obtain a second gas mixture containing carbon dioxide gas, water vapor, carbon monoxide gas, and organic pollutants potentially harmful to a subject.

According to the present disclosure, the condensation dryer 113 is used to receive the second gas mixture from the gas compressor 112, and part of the water vapor in the second gas mixture is converted into liquid water, and then discharged, so as to obtain a dry gas mixture having carbon dioxide gas, water vapor with a volume concentration of less than 1 ppm, carbon monoxide gas and organic pollutants potentially harmful to a subject.

As used herein, the term "subject" refers to any animal of interest, such as humans, monkeys, cows, sheep, horses, pigs, goats, dogs, cats, mice, and rats. In certain embodiments, the subject is a human.

It should be noted that, in the first embodiment of the carbon dioxide purification system, by virtue of the heat exchanger 111 being disposed upstream of the gas compressor 112, the temperature of the waste gas can be decreased, such that the gas compressor 112 does not receive the waste gas with an excessively high temperature, and thus, helps to protect the gas compressor 112, and prolong the service life of the gas compressor 112.

In addition, by virtue of the gas compressor 112 being disposed upstream of the condensation dryer 113, the temperature of the second gas mixture can be decreased, such that after receiving the second gas mixture having a low temperature, the condensation dryer 113 can quickly reduce the temperature of the second gas mixture to a predetermined temperature, thereby efficiently condensing the water vapor in the second gas mixture into liquid water.

The purification unit 2 is disposed downstream of the water removal unit 1 and communicates with the water removal unit 1. The purification unit 2 includes two pressure swing adsorption devices 21 disposed and connected in series with each other. The pressure swing adsorption devices 21 are used to purify carbon dioxide gas from the dry gas mixture, so as to obtain a gas product containing carbon dioxide gas with a purity of more than 99.5%. It should be noted that, the number of the pressure swing adsorption device 21 is not limited to two, and can be adjusted arbitrarily.

According to the present disclosure, each pressure swing adsorption device 21 is filled with a first adsorbent and a second adsorbent, and a volume ratio of the first adsorbent to the second adsorbent in decimal form is 1.

The first adsorbent has an activated carbon molecular sieve and a first metal plating layer plated on the surface of the activated carbon molecular sieve. An example of the activated carbon molecular sieve may include, but is not limited to, an activated carbon molecular sieve derived from coconut shell. In certain embodiments, the activated carbon molecular sieve derived from coconut shell serves as the activated carbon molecular sieve, thereby improving the total surface area of contact between the activated carbon molecular sieve and the dry gas mixture, as well as improving the separation rate of carbon dioxide gas. In certain embodiments, the first metal plating layer may be selected from the group consisting of a titanium dioxide plating layer, a nano-gold plating layer, and a nano-silver plating layer.

The first adsorbent can adsorb carbon monoxide gas in the dry gas mixture, and serves as a catalyst to convert the carbon monoxide gas in the dry gas mixture into carbon dioxide gas, thereby improving the purity of the carbon dioxide gas. In addition, the first adsorbent can adsorb nitrogen oxide gas ($N_xO_y$) present in the substances other than carbon dioxide gas, and serves as a catalyst to convert the nitrogen oxide gas (for example, nitrogen dioxide gas) into nitrogen monoxide gas and oxygen, Therefore, when the gas product containing carbon dioxide gas with a purity of more than 99.5% is subjected to subsequent treatment (for example, a condensation treatment), the nitrogen dioxide gas would not be condensed into a liquid together with the carbon dioxide gas, so that the purity of carbon dioxide in the liquid would not be affected.

The second adsorbent has an aluminosilicate molecular sieve and a second metal plating layer plated on the surface of the aluminosilicate molecular sieve. In certain embodiments, the second metal plating layer may be selected from the group consisting of a titanium dioxide plating layer, a nano-gold plating layer, and a nano-silver plating layer. The second adsorbent is capable of adsorbing the organic pollutants potentially harmful to a subject (for example, dioxins and dioxin-like compounds) which are present in the dry gas mixture, and serves as a catalyst to promote the cleavage reaction of the organic pollutants potentially harmful to a subject, thereby effectively removing the organic pollutants potentially harmful to a subject in the dry gas mixture. In addition, the second adsorbent can also adsorb the substances other than carbon dioxide gas (for example, sulfur and halogen compounds) in the dry gas mixture, thereby effectively removing the substances other than carbon dioxide gas in the dry gas mixture.

It should be noted that, by virtue of the volume ratio of the first adsorbent to the second adsorbent in the respective pressure swing adsorption device 21 being controlled to be 1, the substances other than carbon dioxide gas in the dry gas mixture are effectively removed, so that high-purity carbon dioxide gas can be purified from the dry gas mixture.

In the first embodiment of the carbon dioxide purification system, by virtue of the three drying devices 11 (i.e., the heat exchanger 111, the gas compressor 112, and the condensation dryer 113 in sequence from upstream to downstream) in combination with the pressure swing adsorption devices 21 filled with the first adsorbent and the second adsorbent, when the waste gas from the generator 9 passes through the three drying devices 11 in sequence, most of the water vapor is removed, such that the pressure swing adsorption devices 21 can efficiently purify carbon dioxide gas from the dry gas mixture, so as to obtain the gas product containing carbon dioxide gas with a purity of more than 99.5%. It should be noted that, since the carbon dioxide gas in the gas product has the purity required for cell culture procedures, the gas product containing carbon dioxide gas with a purity of more than 99.5% can be directly delivered to a cell culture system for use. Therefore, the carbon dioxide purification system of the present disclosure can reduce carbon emissions and has the advantage of being environmentally friendly.

Figure 2:
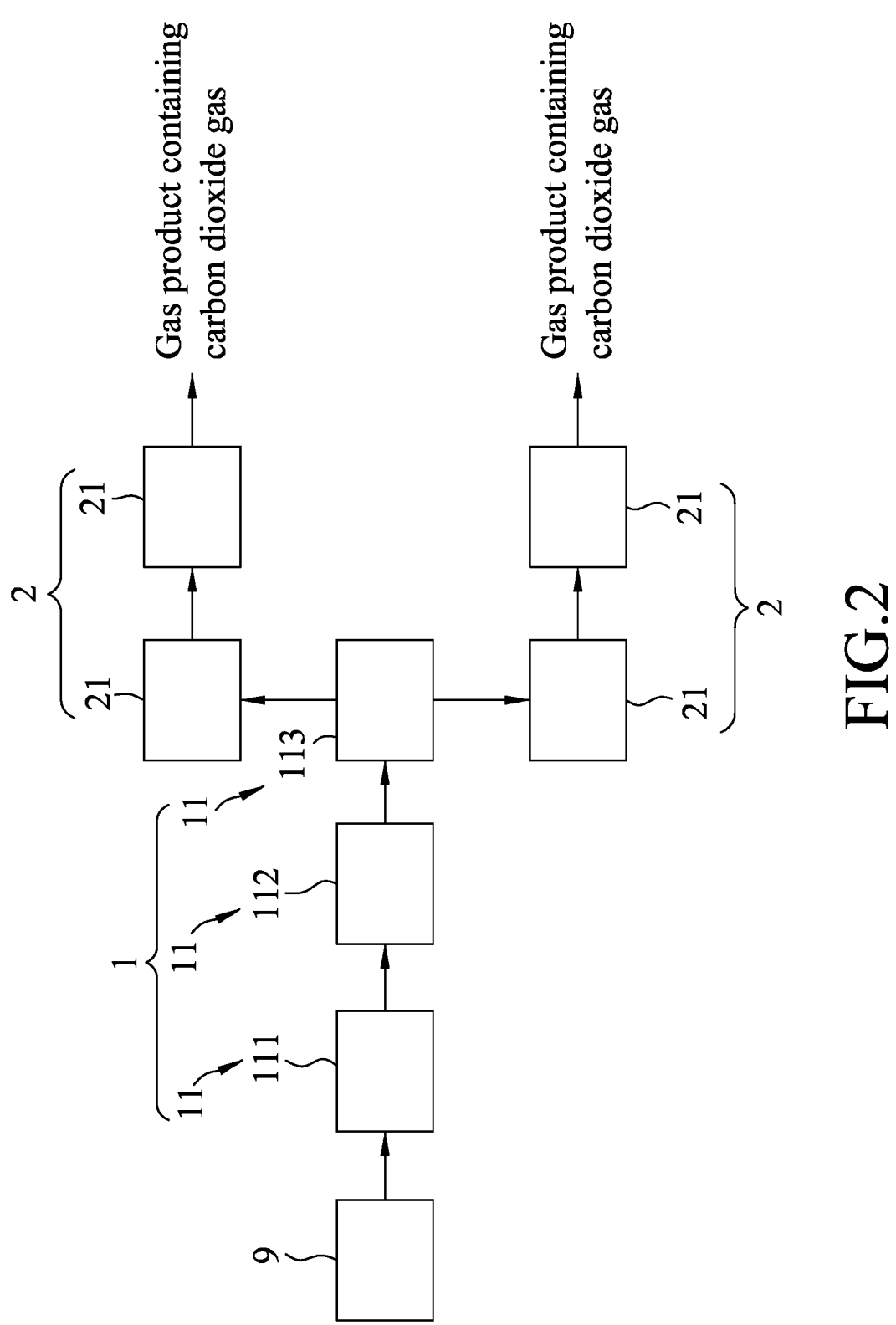
FIG. 2 is a schematic view illustrating a second embodiment of the carbon dioxide purification system according to the present disclosure.

Referring to FIG. 2, a second embodiment of the carbon dioxide purification system according to the present disclosure is substantially the same as the first embodiment of the carbon dioxide purification system, except that in the second embodiment, the carbon dioxide purification system includes two purification units 2, and the two purification units 2 are disposed downstream of the water removal unit 1 and communicate with the water removal unit 1, respectively. It should be noted that, in this embodiment, the number of the purification units 2 is not lower than 2, and can be adjusted arbitrarily.

Figure 3:
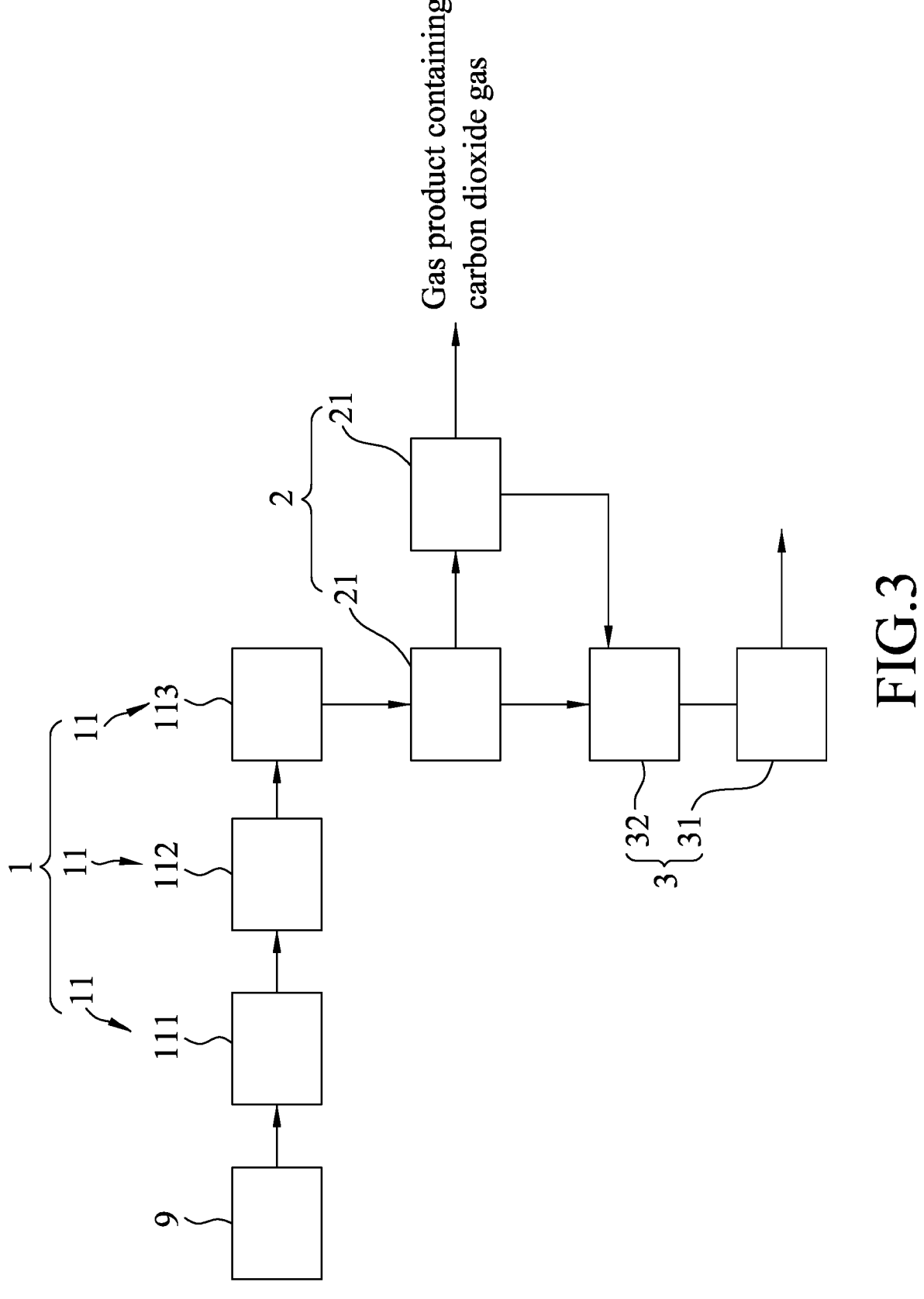
FIG. 3 is a schematic view illustrating a third embodiment of the carbon dioxide purification system according to the present disclosure.

Referring to FIG. 3, a third embodiment of the carbon dioxide purification system according to the present disclosure is substantially the same as the first embodiment of the carbon dioxide purification system except for the following differences. In the third embodiment, the carbon dioxide purification system includes a reactivation unit 3 which communicates with the purification unit 2 and is used to reactivate the first adsorbent and the second adsorbent. The reactivation unit 3 includes a rotary vane pump 31 and a lobe-type pump 32 connected to the rotary vane pump 31. The rotary vane pump 31 is used to reduce the pressure in the pressure swing adsorption devices 21 from 760 torr to 1 torr. The lobe-type pump 32 serves as a strengthening pump, and further reduces the pressure in the pressure swing adsorption devices 21 from 1 torr to 0.001 torr. To be specific, by virtue of the cooperation of the rotary vane pump 31 and the lobe-type pump 32, the reactivation unit 3 can reduce the pressure in the pressure swing adsorption devices 21, such that the substances other than carbon dioxide gas adsorbed on the first adsorbent and the second adsorbent can be desorbed from the first adsorbent and the second adsorbent. After that, the reactivation unit 3 can receive the desorbed substances other than carbon dioxide gas, and then discharge such substances to a subsequent processing device for processing, thereby achieving the purpose of reactivating the first adsorbent and the second adsorbent.

Figure 4:
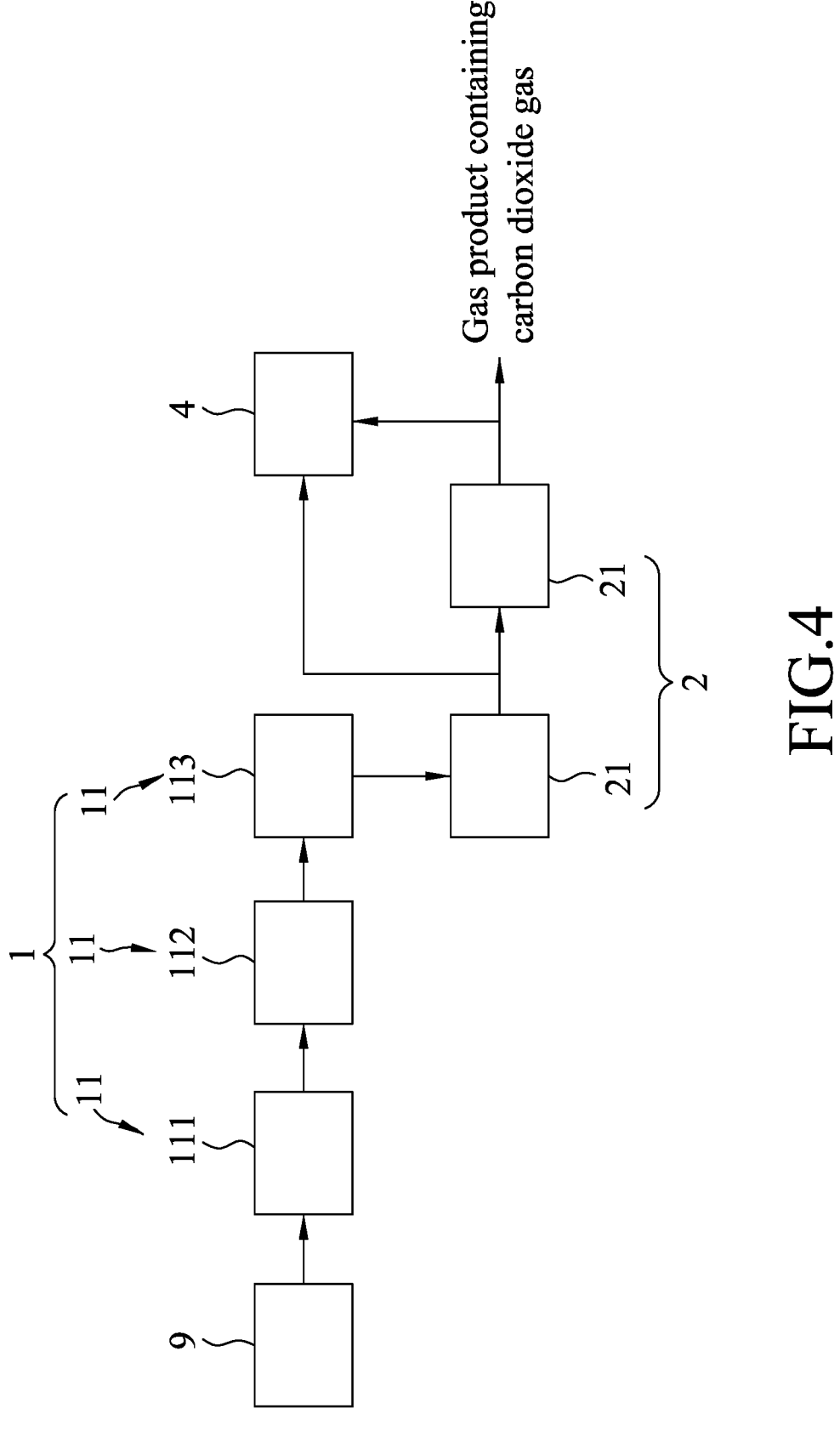
FIG. 4 is a schematic view illustrating a fourth embodiment of the carbon dioxide purification system according to the present disclosure.

Referring to FIG. 4, a fourth embodiment of the carbon dioxide purification system according to the present disclosure is substantially the same as the first embodiment of the carbon dioxide purification system except for the following differences. In the fourth embodiment, the carbon dioxide purification system includes a detection unit 4 which is connected to the purification unit 2 and is used to detect the purity of the carbon dioxide gas in the purification unit 2. To be specific, the detection unit 4 is used to receive the purified dry gas mixture containing carbon dioxide gas transported between the pressure swing adsorption devices 21, or, is used to receive the gas product containing carbon dioxide gas from the purification unit 2, and then detects the purity of the carbon dioxide gas in the dry gas mixture or the gas product to ensure that the purity of the carbon dioxide gas in the gas product is more than 99.5%. An example of the detection unit 4 may include, but is not limited to, a mass spectrometer.

Figure 5:
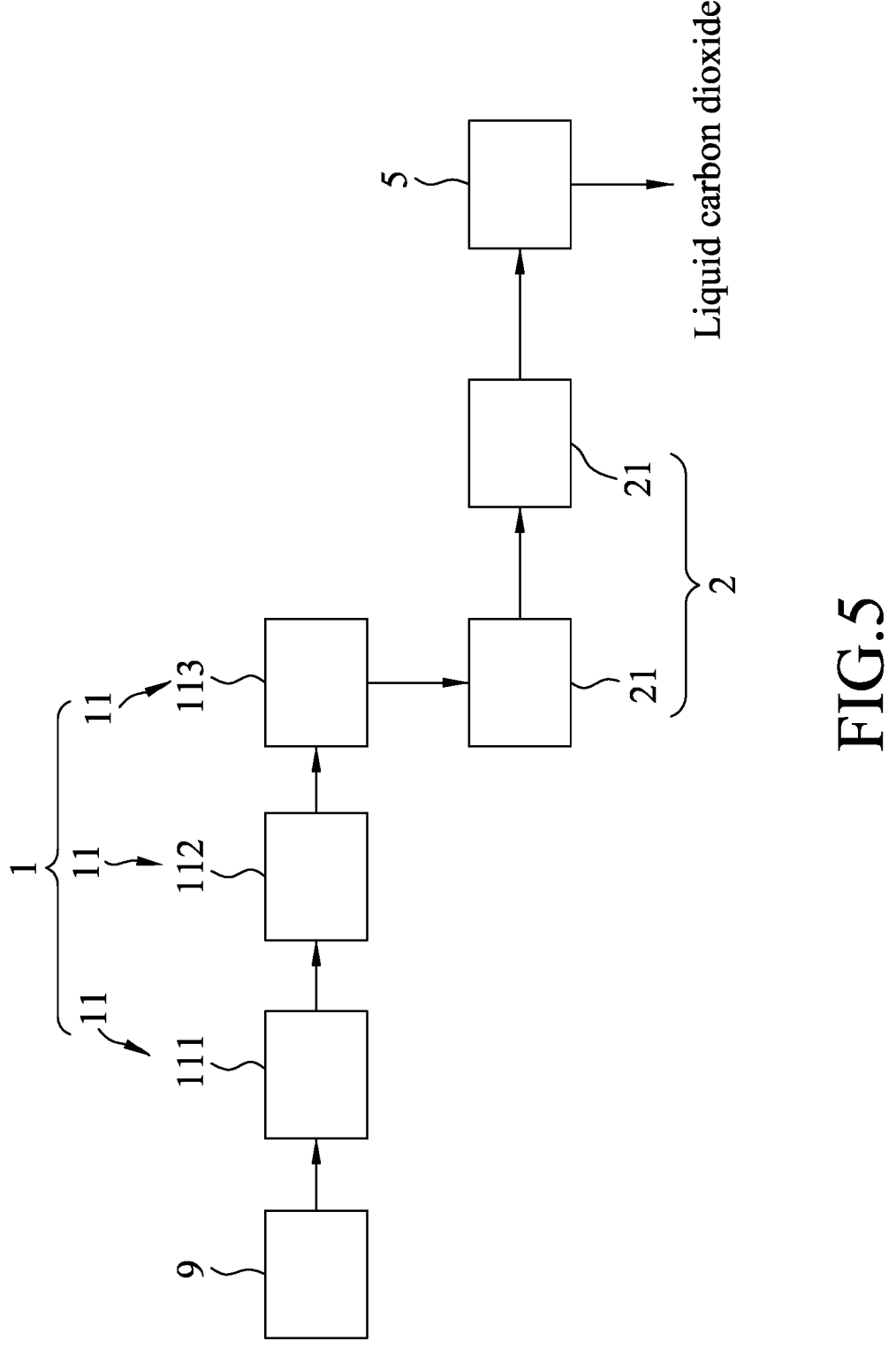
FIG. 5 is a schematic view illustrating a fifth embodiment of the carbon dioxide purification system according to the present disclosure.

Referring to FIG. 5, a fifth embodiment of the carbon dioxide purification system according to the present disclosure is substantially the same as the first embodiment of the carbon dioxide purification system except for the following differences. In the fifth embodiment, the carbon dioxide purification system includes a liquefaction processing unit 5 which is disposed downstream of the purification unit 2, and is used to receive the gas product containing carbon dioxide gas and to convert the carbon dioxide gas into liquid carbon dioxide. By virtue of the liquefaction processing unit 5, the high-purity carbon dioxide gas in the gas product is converted into liquid carbon dioxide for storage, thereby increasing the storage capacity of carbon dioxide in a single storage device. Alternatively, the liquid carbon dioxide may be further subjected to a purification treatment to obtain carbon dioxide gas.

Figure 6:
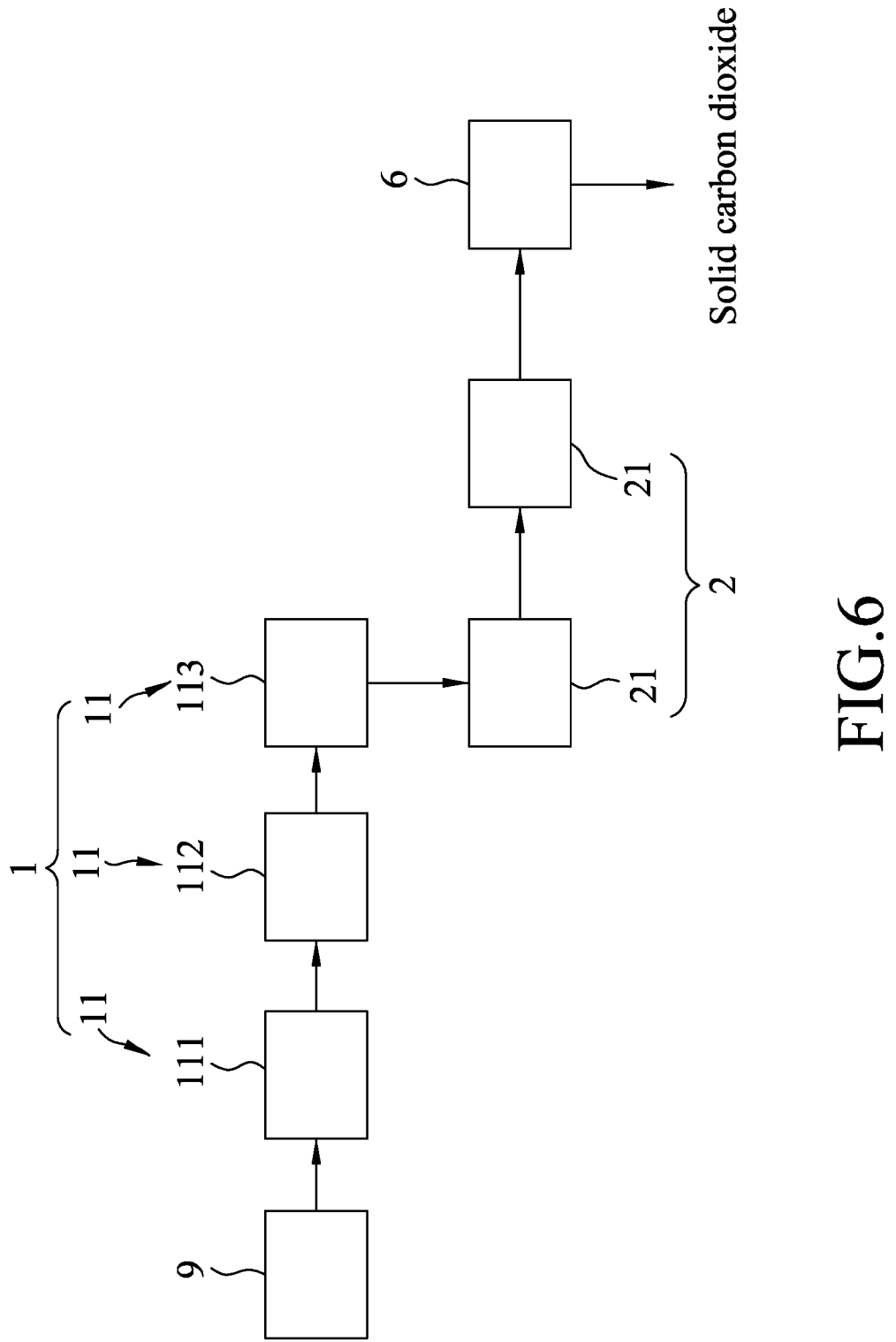
FIG. 6 is a schematic view illustrating a sixth embodiment of the carbon dioxide purification system according to the present disclosure.

Referring to FIG. 6, a sixth embodiment of the carbon dioxide purification system according to the present disclosure is substantially the same as the first embodiment of the carbon dioxide purification system except for the following differences. In the sixth embodiment, the carbon dioxide purification system includes a solidification processing unit 6 which is disposed downstream of the purification unit 2, and is used to receive the gas product containing carbon dioxide gas and to convert the carbon dioxide gas into solid carbon dioxide. By virtue of the solidification processing unit 6, the high-purity carbon dioxide gas in the gas product is converted into solid carbon dioxide (i.e., dry ice) for subsequent use.

To sum up, by virtue of the water removal unit 1 including the drying devices 11 which are used to reduce the volume concentration of water vapor in the waste gas to less than 1 ppm and the purification unit 2 including the pressure swing adsorption devices 21 filled with the first adsorbent and the second adsorbent, the carbon dioxide purification system of the present disclosure can effectively purify the gas product containing carbon dioxide gas with a purity of 99.5% from the waste gas. In addition, since the carbon dioxide gas in the gas product has the purity required for cell culture procedures, the gas product can be directly delivered to a cell culture system for use. Therefore, the carbon dioxide purification system of the present disclosure can reduce carbon emissions and has the advantage of being environmentally friendly.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A carbon dioxide purification system for the treatment of a waste gas produced by a generator, comprising:
a water removal unit which includes at least one drying device for reducing water vapor in the waste gas from the generator, the waste gas passing through the at least one drying device, so as to form a dry gas mixture having carbon dioxide gas, water vapor with a volume concentration of less than 1 ppm, carbon monoxide gas, and organic pollutants potentially harmful to a subject; and
   a purification unit which is disposed downstream of the water removal unit and communicates with the water removal unit, and includes a plurality of pressure swing adsorption devices disposed and connected in series with each other, the pressure swing adsorption devices being used to purify carbon dioxide gas from the dry gas mixture, so as to obtain a gas product containing carbon dioxide gas with a purity of more than 99.5%, wherein each pressure swing adsorption device is filled with a first adsorbent and a second adsorbent, the first adsorbent having an activated carbon molecular sieve and a first plating layer plated on the surface of the activated carbon molecular sieve, and the second adsorbent having an aluminosilicate molecular sieve and a second plating layer plated on the surface of the aluminosilicate molecular sieve, a volume ratio of the first adsorbent to the second adsorbent in decimal form being 1, each of the first plating layer and the second plating layer being selected from the group consisting of a titanium dioxide plating layer, a nano-gold plating layer, and a nano-silver plating layer.

2. The carbon dioxide purification system as claimed in claim 1, wherein the at least one drying device is selected from the group consisting of a heat exchanger, a gas compressor, and a condensation dryer.

3. The carbon dioxide purification system as claimed in claim 2, wherein the water removal unit includes three drying devices connected to each other, and the drying devices are a heat exchanger, a gas compressor, and a condensation dryer in sequence from upstream to downstream.

4. The carbon dioxide purification system as claimed in claim 1, further comprising a reactivation unit which communicates with the purification unit and is used to reactivate the first adsorbent and the second adsorbent.

5. The carbon dioxide purification system as claimed in claim 4, wherein the reactivation unit includes a rotary vane pump and a lobe-type pump connected to the rotary vane pump.

6. The carbon dioxide purification system as claimed in claim 1, further comprising a liquefaction processing unit which is disposed downstream of the purification unit and is used to receive the gas product containing carbon dioxide gas and to convert the carbon dioxide gas into liquid carbon dioxide.

7. The carbon dioxide purification system as claimed in claim 1, further comprising a solidification processing unit which is disposed downstream of the purification unit and is used to receive the gas product containing carbon dioxide gas and to convert the carbon dioxide gas into solid carbon dioxide.

8. The carbon dioxide purification system as claimed in claim 1, further comprising a detection unit which is connected to the purification unit and is used to detect the purity of the carbon dioxide gas present in the purification unit.

* * * * *